United States Patent
Bhalla

(12) 
(10) Patent No.: US 6,188,814 B1
(45) Date of Patent: Feb. 13, 2001

(54) PACKAGED MICROELECTROMECHANICAL DEVICES AND SYSTEMS

(75) Inventor: Kulbir Singh Bhalla, Red Bank, NJ (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 09/366,372

(22) Filed: Aug. 3, 1999

(51) Int. Cl.⁷ .................................................. G02B 6/24
(52) U.S. Cl. .............................. 385/15; 385/47; 385/134
(58) Field of Search .................................. 385/14–15, 47, 385/115, 134

(56) References Cited

U.S. PATENT DOCUMENTS

| | | | |
|---|---|---|---|
| 5,367,584 | * 11/1994 | Ghezzo et al. | 385/17 |
| 5,367,585 | * 11/1994 | Ghezzo et al. | 385/23 |
| 5,761,350 | * 6/1998 | Koh | 385/14 |
| 5,870,518 | * 2/1999 | Haake et al. | 385/90 |
| 5,911,021 | * 6/1999 | MacDonald et al. | 385/35 |
| 5,960,132 | * 9/1999 | Lin | 385/18 |
| 6,013,025 | * 1/2000 | Bonne et al. | 600/160 |
| 6,058,229 | * 5/2000 | Burrows et al. | 385/24 |
| 6,137,941 | * 10/2000 | Robinson | 385/140 |

* cited by examiner

Primary Examiner—Frank G. Font
Assistant Examiner—Sang H. Nguyen

(57) ABSTRACT

A packaged microelectromechanical device having a housing with a plurality of ports. A bundle of a plurality of optical fibers is mounted in one of the plurality of ports by a welded or brazed flange. An array-type microelectromechanical device is mounted in another port of the housing by a welded or brazed flange and includes a plurality of elements adapted for interacting with the plurality of optical fibers, whereby information may be transmitted into the housing via one of the optical fibers and may be transferred out of the housing via another of the optical fibers. The array-type microelectromechanical device has a plurality of electrical control pins protruding outside the housing. A pair of windows in the housing provides ports for optical sensory signals for the array-type microelectromechanical device. Two conduits for providing pressurized inert gas are mounted in the housing by welded or brazed flanges. The housing provides a hermetically sealed enclosure for the bundle of the plurality of optical fibers, the windows, the array-type microelectromechanical device, and the conduits. The pressurized inert gas is used to remove dust and moisture during assembly but remains in the finished assembly. Helium in the gas enables detection of leaks.

9 Claims, 2 Drawing Sheets

PACKAGED MICROELECTROMECHANICAL DEVICES AND SYSTEMS

TECHNICAL FIELD

This invention relates generally to the field of microelectromechanical devices and systems and in particular to packaging of microelectromechanical devices and systems for communication, telemetry, and information processing.

BACKGROUND OF THE INVENTION

Microelectromechanical devices have become increasingly used for applications for which no comparable non-mechanical electronic device is available. Even for switching applications for optical communication, telemetry, and information processing systems, for which non-mechanical electronic devices do exist, a need for augmented capabilities is frequently met by microelectromechanical devices.

Nevertheless, as increasing numbers of devices are fit into ever-smaller spaces, optical microelectromechanical devices (hereinafter, "MEMS") become impaired by dust, smoke, and moisture condensation in spaces that must be kept optically free. Impairment occurs when design standards fail to be met. For example, for a telephone central office application, design standards like Telcordia's Network Equipment Building Systems standards need to be met. These standards are intolerant of any dust, smoke, or moisture condensation in the free spaces of optical switches. The technical and economic consequences of failures to meet such standards increase markedly as the size of an optical switching array grows. Thus, a need exists for avoiding the effects of dust, smoke, and moisture condensation in optical switching arrays. It is anticipated that this need extends to other MEMS devices and systems.

SUMMARY OF THE INVENTION

According to the invention, a packaged microelectromechanical device having a housing with a plurality of ports for a number of different optical elements is hermetically sealed. In a preferred embodiment, the different optical elements at the plurality of ports include a bundle of optical fibers and an array of MEMS steerable mirrors.

According to a feature of the invention, a hermetic seal of the housing is facilitated by a conduit arrangement for evacuating the housing and pressurizing it with an inert atmosphere. In the preferred embodiment, two conduits are used, one for evacuating the housing and another for pressurizing it with an inert atmosphere, which remains in the completed device. At each port the respective optical element is secured to the housing by a flange that is welded or brazed.

Other features and advantages of the present invention will become apparent from the following description.

BRIEF DESCRIPTION OF THE DRAWING

The teachings of the present invention can be readily understood by considering the following detailed description in conjunction with the accompanying drawings, in which.

DETAILED DESCRIPTION

Preferred implementations of the various aspects of the invention will now be described while referring to the figures, several of which may be simultaneously referred to during the course of the following description.

Figure 1:
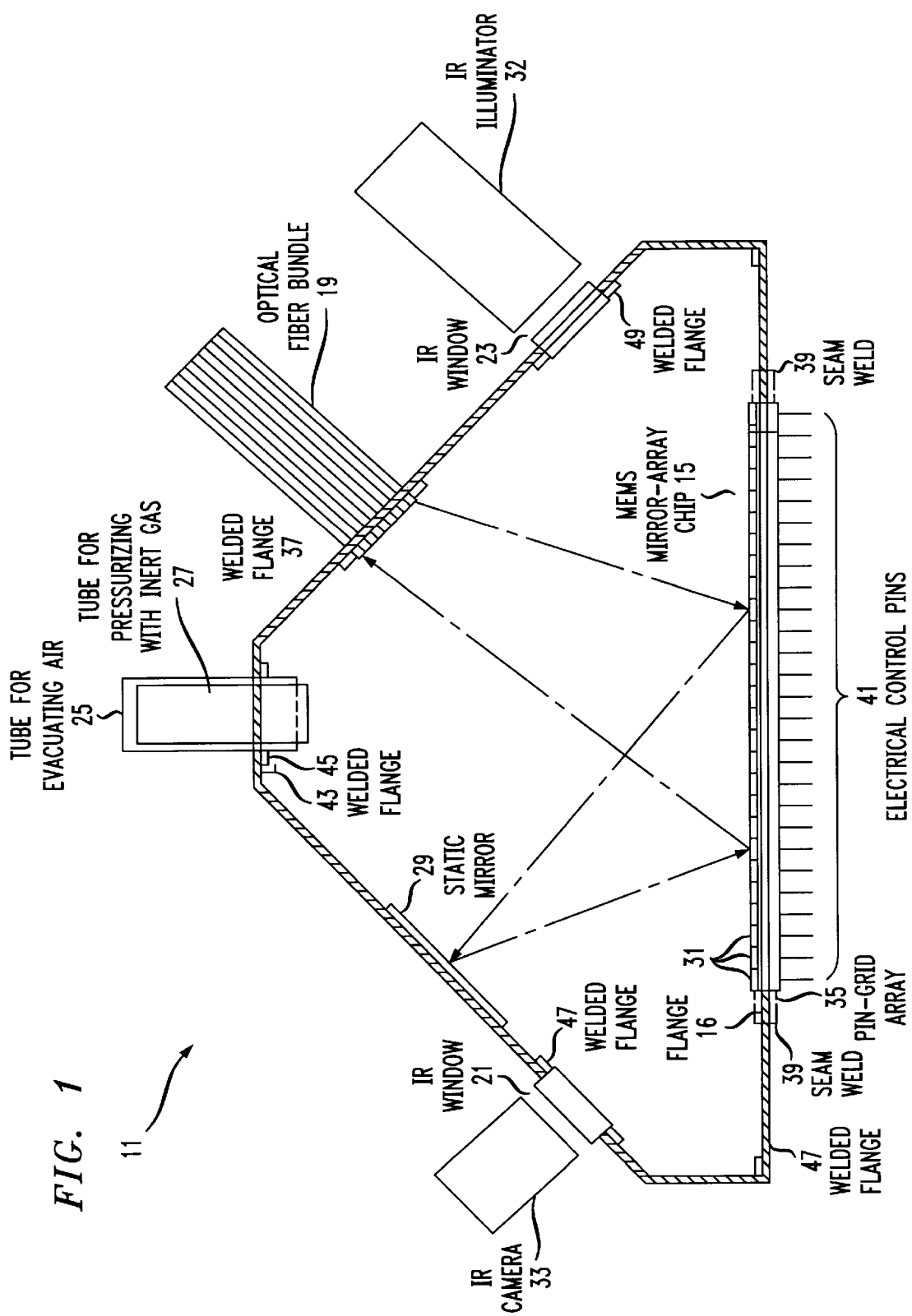
FIG. 1 is a top, partial-sectional view of an assembly according to the invention.

In FIG. 1, an illustrative assembly 11 according to the invention includes an approximately bell-shaped housing 13 closed at what would otherwise be the bell-opening end by MEMS chip 15 having an array of steerable mirrors and having a mounting flange 17. The fit between housing 13 and flange 17 is adapted to facilitate a hermetic seal. Preferably, the flange 17 is welded or brazed to the housing 13.

The housing 13 includes a plurality of ports. A first one is the opening in which optical fiber bundle 19 is disposed. A second one is the already-mentioned bell opening of the housing 13. Third and fourth ports are openings in which infrared radiation windows 21 and 23 are mounted via suitable flanges 47 and 49 like flange 17. Fifth and sixth ports are occupied by tube 25 for evacuating air and tube 27 for pressurizing with inert gas, such as argon with a trace of helium. Tubes 25 and 27 are secured to housing 13 by flanges 43 and 45 that are welded or brazed to housing 13.

Static mirror 29 also appears in housing 13 but does not require a port because its function is purely internal. It is bonded to the inner wall of the housing.

The material of housing 13 is illustratively 410 stainless steel but could also be Invar or some other material with an appropriate coefficient of expansion. Flange 17 and the other flanges should also be of the same material.

MEMS chip 15 is a silicon semiconductor chip providing a suitable substrate for integrated MEMS elements including steerable mirror elements 31 and their associated integrated actuators (not shown), which may be of known type. MEMS chip 15 is illustratively wire-bonded to a pin-grid array (PGA) 35. PGA 35 has its own flange 16 that is seam-welded to flange 17 at seam weld 39.

Windows 21 and 23 should be of infrared-transmitting material, such as silica, sapphire, or quartz. They are hermetically sealed in their ports by flanges 47 and 49 that are welded or brazed to housing 13.

The optical fiber bundle 19 is an assembly including an array of collimating lenses (not shown), each in front of a respective fiber. Also included is a flange 37 adapted as a collar for optical fiber bundle 19 and welded or brazed to housing 13. Flange 37 is oriented on optical fiber bundle 19 to determine the angle of entry of optical fiber bundle 19 into housing 13. While the angles within assembly 11 are not necessarily shown to scale, a light ray from any of steerable mirror elements 31 to any of the optical fibers in optical fiber bundle 19 should arrive at the optical fiber within the acceptance angle of the optical fiber and its collimating lens.

Mounted outside of assembly 11 (by mounts not shown) are infrared illuminator 32 at window 23 and infrared camera 33 at window 21. Infrared illuminator 32 and camera 33 cooperate to provide images from which a microcomputer can determine the angular position of each of mirror elements 31 at any instant.

For long term reliability, the preferred seal of each of the components into its respective port is an appropriate flange about that component. Each flange is welded or brazed to housing 13. Other less desirable seals are soldered seals, O-rings, metallic gaskets, or polymeric gaskets.

During fabrication of assembly 11, argon with a trace of helium is pumped through tube 27 to assist in the evacuating of air, any pre-existing ambient gases, dust, and moisture in assembly 11, while a vacuum pump connected to tube 25. When substantially pure argon is detected in tube 25, pinch welding seals tube 25; and the vacuum pump is disconnected. Input of argon through tube 27 is continued until an appropriate pressure is reached. Pinch welding then seals tube 27, and the argon supply is removed. The pressurized inert gas remains in the finished assembly. A trace of helium is used in the argon supply in this procedure, and also remains in the pressurized inert gas, to facilitate detection of leaks from the hermetically sealed housing 13. The finished assembly remains free of dust and moisture.

Figure 2:
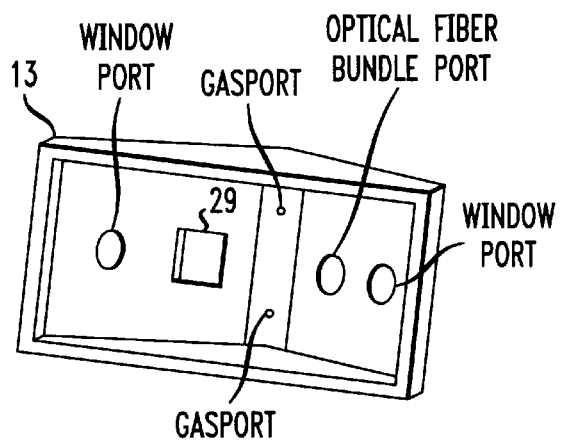
FIG. 2 is an open, front-elevation view of the housing of the assembly.

FIG. 2 shows an elevation of housing 13 with its ports empty and static mirror 29 mounted inside.

Figure 3:
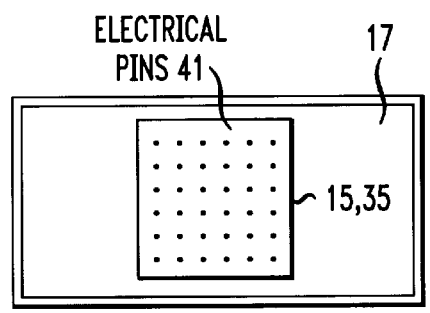
FIG. 3 is a front-elevation view of the housing closed by a MEMS device.

FIG. 3 shows a related elevation of MEMS mirror-array chip 15 and its flange 17. The external electrical pins 41 of the PGA 35 can be seen.

Figure 4:
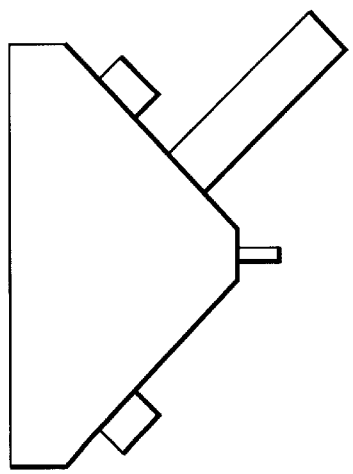
FIG. 4 is a top view of the housing, accompanied by pictorial depiction of the use of the ports.
Figure 5:
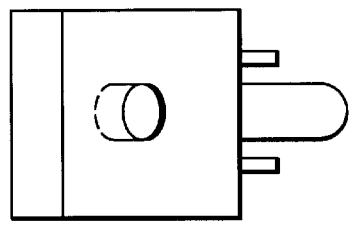
FIG. 5 is a side view of the housing, corresponding to that of FIG. 4.

FIG. 4 shows a top view of a completed assembly 11; and FIG. 5 shows a side view of the same completed assembly 11. The optical fiber bundle is indicated by the longer protrusion in FIGS. 4 and 5.

Many possible variations of the preceding implementations of the invention should be apparent to one of ordinary skill in the art from the preceding description of the invention; and others may be acquired through the practice of the invention. All such variations are within the spirit and scope of the following claims or their equivalents.

The claimed invention is:

1. A packaged microelectromechanical device comprising:
   a housing having a plurality of ports;
   a bundle of a plurality of optical fibers in a first one of said plurality of ports; and
   an array-type microelectromechanical device in a second one of said plurality of ports of said housing, said microelectromechanical device including a plurality of elements adapted for interacting with said plurality of optical fibers, whereby information may be transmitted into said housing via one of said plurality of optical fibers and may be transferred out of said housing via another of said plurality of optical fibers,
   said housing providing a hermetically sealed enclosure of said plurality of ports.

2. The packaged microelectromechanical device according to claim 1, further including:
   means in a third one of said plurality of ports of said housing for passing sensory signals to or from said array-type microelectromechanical device.

3. The packaged microelectromechanical device according to claim 2, wherein:
   said means for passing sensory signals to or from said array-type microelectromechanical device comprises at least one window for optical sensory signals.

4. The packaged microelectromechanical device according to claim 2, wherein:
   said array-type microelectromechanical device includes electrical control pins appearing externally at said second one of said plurality of ports.

5. The packaged microelectromechanical device according to claim 2, further including:
   a conduit in a fourth one of the plurality of ports of said housing for supplying pressurized inert gas in said housing, said conduit forming part of the hermetically sealed enclosure of said housing.

6. A packaged microelectromechanical device comprising:
   a housing having a plurality of ports;
   a bundle of a plurality of optical fibers penetrating a first one of said plurality of ports;
   an array-type microelectromechanical device in a second one of said plurality of ports of said housing, said microelectromechanical device including a support element and a plurality of elements on said support element, each of said plurality of elements being adapted for interacting with said plurality of optical fibers, whereby information may be transmitted into said housing via one of said plurality of optical fibers and may be transferred out of said housing via another of said plurality of optical fibers, said device having a plurality of electrical control pins appearing outside of said housing;
   at least one window in at least a third one of said plurality of ports, said window being for optical sensory signals to or from said array-type microelectromechanical device; and
   two conduits in fourth and fifth ones of the plurality of ports of said housing, said two conduits being for providing pressurized inert gas in said housing,
   said housing providing a hermetically sealed enclosure of said bundle of the plurality of optical fibers, said window, said conduits, and said array-type microelectromechanical device.

7. A packaged microelectromechanical device comprising:
   a housing having a plurality of ports;
   a bundle of a plurality of optical fibers in a first one of said plurality of ports and having a flange welded or brazed to said housing;
   an array-type microelectromechanical device in a second one of said plurality of ports of said housing, said microelectromechanical device including a support element and a plurality of elements on said support element, each of said plurality of elements being adapted for interacting with said plurality of optical fibers, whereby information may be transmitted into said housing via one of said plurality of optical fibers and may be transferred out of said housing via another of said plurality of optical fibers, said device having a plurality of electrical control pins appearing outside of said housing and having a flange welded or brazed to said housing; and
   and a pressurized inert atmosphere in said housing.

8. The packaged microelectromechanical device according to claim 7, further including a pair of conduits in third and fourth ones of said plurality of ports for providing pressurized inert atmosphere in said housing, said pair of conduits having respective flanges welded or brazed to said housing.

9. The packaged microelectromechanical device according to claim 8, further including at least one window in at least a fifth one of said plurality of ports, said window being for optical sensory signals to or from said array-type microelectromechanical device and having a flange welded or brazed to said housing, said housing providing a hermetically sealed enclosure of said bundle of the plurality of optical fibers, said window, said conduits, and said array-type microelectromechanical device.

* * * * *